US012651198B2

(12) United States Patent
Rawat et al.

(10) Patent No.: US 12,651,198 B2
(45) Date of Patent: Jun. 9, 2026

(54) PROVIDING ONLINE EXPERT-IN-THE-LOOP TRAINING OF MACHINE LEARNING MODELS

(71) Applicant: INTERNATIONAL BUSINESS MACHINES CORPORATION, Armonk, NY (US)

(72) Inventors: Ambrish Rawat, Dublin (IE); Oznur Alkan, Clonsilla (IE); Rahul Nair, Dublin (IE); Fearghal O'Donncha, Aran Islands (IE)

(73) Assignee: International Business Machines Corporation, Armonk, NY (US)

( * ) Notice: Subject to any disclaimer, the term of this patent is extended or adjusted under 35 U.S.C. 154(b) by 1006 days.

(21) Appl. No.: 17/650,763

(22) Filed: Feb. 11, 2022

(65) Prior Publication Data

US 2023/0259807 A1     Aug. 17, 2023

(51) Int. Cl.
| | |
|---|---|
| *G06N 20/00* | (2019.01) |
| *G06F 18/21* | (2023.01) |
| *G06F 18/22* | (2023.01) |
| *G06F 18/23* | (2023.01) |

(52) U.S. Cl.
CPC ......... *G06N 20/00* (2019.01); *G06F 18/2178* (2023.01); *G06F 18/22* (2023.01); *G06F 18/23* (2023.01)

(58) Field of Classification Search
None
See application file for complete search history.

(56) References Cited

U.S. PATENT DOCUMENTS

| | | | |
|---|---|---|---|
| 7,792,353 | B2 | 9/2010 | Forman et al. |
| 8,250,009 | B1 | 8/2012 | Breckenridge et al. |
| 9,248,569 | B2 | 2/2016 | Laurent et al. |
| 9,781,243 | B1 | 10/2017 | Huang |
| 10,157,347 | B1 | 12/2018 | Kasturi et al. |
| 10,921,801 | B2 | 2/2021 | Cella et al. |
| 11,176,491 | B2 * | 11/2021 | Bettencourt-Silva ....................... G06N 20/00 |
| 11,636,331 | B2 * | 4/2023 | Vijaykeerthy ........... G06N 3/08 706/12 |
| 2002/0147694 | A1 | 10/2002 | Dempsey et al. |
| 2012/0041779 | A1 * | 2/2012 | Boroczky .............. G16H 40/63 705/2 |
| 2012/0150860 | A1 * | 6/2012 | Bhamidipati ......... G06F 16/355 707/E17.09 |

(Continued)

OTHER PUBLICATIONS

Heim, Eric, "Efficiently and effectively learning models of similarity from human feedback", Dissertation, University of Pittsburgh, 2015, (154 pages).

(Continued)

*Primary Examiner* — Ryan Barrett
(74) *Attorney, Agent, or Firm* — Kristofer Haggerty

(57) ABSTRACT

Embodiments for providing expert-in-the-loop training of machine learning models in a computing environment by a processor. A performance of a machine learning model may be learned. Feedback for the machine learning model may be received based on learning the performance the machine learning model, where the feedback includes domain knowledge provided by a domain expert. The machine learning model may be trained or updated based the feedback of the performance of the machine learning model.

20 Claims, 6 Drawing Sheets

(56)         References Cited

U.S. PATENT DOCUMENTS

| | | | |
|---|---|---|---|
| 2013/0332260 A1* | 12/2013 | Cheng | G06Q 30/0243 |
| | | | 705/14.42 |
| 2014/0365403 A1 | 12/2014 | Demuth et al. | |
| 2015/0178638 A1 | 6/2015 | Deshpande et al. | |
| 2016/0300120 A1* | 10/2016 | Haas | G06T 7/149 |
| 2017/0193185 A1* | 7/2017 | Barker | G06F 16/334 |
| 2017/0262360 A1* | 9/2017 | Kochura | G06F 40/279 |
| 2018/0068222 A1* | 3/2018 | Brennan | G06N 5/022 |
| 2019/0279102 A1* | 9/2019 | Cataltepe | G06V 10/80 |
| 2020/0118041 A1* | 4/2020 | Bettencourt-Silva | |
| | | | G06N 5/048 |
| 2021/0081848 A1* | 3/2021 | Polleri | G06F 11/3409 |
| 2021/0165954 A1* | 6/2021 | Iyer | G06N 3/09 |
| 2022/0004429 A1* | 1/2022 | Bhamidipaty | G06F 18/24 |
| 2022/0058347 A1* | 2/2022 | Singaraju | H04L 51/02 |
| 2022/0171991 A1* | 6/2022 | Das | G06F 18/40 |
| 2022/0172004 A1* | 6/2022 | Das | G06F 9/542 |
| 2022/0172099 A1* | 6/2022 | Das | G06N 20/00 |
| 2022/0215285 A1* | 7/2022 | Daly | G06N 20/00 |
| 2022/0300831 A1* | 9/2022 | Friede | G06N 3/091 |
| 2022/0343206 A1* | 10/2022 | Nguyen | G06N 20/00 |
| 2022/0374769 A1* | 11/2022 | Sangroya | G06N 20/00 |
| 2022/0383096 A1* | 12/2022 | Zhu | G06F 18/2193 |
| 2023/0130462 A1* | 4/2023 | Parihar | G05B 19/4155 |
| | | | 700/28 |
| 2023/0229946 A1* | 7/2023 | O'Shaughnessy | G06N 5/045 |
| | | | 706/45 |
| 2023/0289634 A1* | 9/2023 | Li | G06F 30/27 |
| 2024/0193438 A1* | 6/2024 | Carrieri | G06N 20/00 |

OTHER PUBLICATIONS

Konik et al., "Learning goal hierarchies from structured observations and expert annotations", Conference paper, Machine Learning, 64(1-3):457-483, DOI:10.1007/978-3-540-30109-7_17, 2006 (25 pages).

Pandya et al., "A robotic recording and playback platform for training surgeons and learning autonomous behaviors using the da vinci surgical system", MDPI, Robotics 2019, 8, 9, https://doi.org/10.3390/robotics8010009, (18 pages).

Gungor et al., "Method and system for an adaptive and automated hyperparameter tuning algorithm", IPCOM000264511D, Dec. 2020, (4 pages).

Anonymous, "Method and system for providing a rapid learning framework by integrating subject matter expert (SME) and machine learning models extending reach to unknown data sets and eliminating bias", IPCOM000260432D, Nov. 2019, (6 pages).

Anonymous, "Ranking and automatic selection of machine learning models", IPCOM000252275D, Jan. 2018, (34 pages).

Chawla, et al., SMOTE: Synthetic Minority Over-Sampling Technique, Journal of Artificial Intelligence Research, Jan. 2002, vol. 16, Issue 1, pp. 321-357.

Fuhl, et al., Explainable Online Validation of Machine Learning Models for Practical Applications, arXiv:2010.00821v3 [cs.LG], Jan. 17, 2021, 9 pages.

Kabra, et al., MixBoost: Synthetic Oversampling with Boosted Mixup for Handling Extreme Imbalance, arXiv:2009.01571v1 [cs.LG], Sep. 3, 2020, 10 pages.

Mandel, et al., Using the Crowd to Prevent Harmful AI Behavior, Proceedings of the ACM on Human-Computer Interaction, Oct. 15, 2020, vol. 4, Issue CSCW2 Article No. 97, 25 pages.

Marcotcr/Lime, Retrieved from: https://github.com/marcotcr/lime, Retrieved Date: May 18, 2025 6 pages.

Raissi, et al., Physics-Informed Neural Networks: A Deep Learning Framework for Solving Forward and Inverse Problems Involving Nonlinear Partial Differential Equations, Journal of Computational Physics, Oct. 26, 2018, vol. 378, pp. 686-707.

Shap/Shap, Retrieved from: https://github.com/slundberg/shap, Retrieved Date: May 18, 2025, 12 pages.

Shi, et al., Deep Learning for Precipitation Nowcasting: A Benchmark and A New Model, arXiv:1706.03458v2 [cs.CV], Oct. 5, 2017, 17 pages.

Smith, et al., Mitigating Algorithmic Bias: Evolving an Augmentation Policy that is Non-Biasing, Proceedings of the IEEE/CVF Winter Conference on Applications of Computer Vision (WACV) Workshops, 2020, pp. 90-97.

Stumpf, et al., Toward Harnessing User Feedback For Machine Learning, IUI '07: Proceedings of the 12th International Conference On Intelligent User Interfaces, Jan. 28, 2007, pp. 82-91.

Teso, et al., Explanatory Interactive Machine Learning, AIES '19: Proceedings of the 2019 AAAI/ACM Conference on AI, Ethics, and Society, Jan. 27, 2019, pp. 239-245.

Thomas, et al., Preventing Undesirable Behavior of Intelligent Machines, Science, Nov. 22, 2019, vol. 366, Issue 6468, pp. 999-1004.

Trusted-AI/AIX360, Retrieved from: https://github.com/Trusted-AI/AIX360, Retrieved Date: May 18, 2025 6 pages.

Xin, et al., Accelerating Human-in-the-loop Machine Learning: Challenges and Opportunities, arXiv:1804.05892v1 [cs.DB], Apr. 16, 2018, 4 pages.

* cited by examiner

600

START ~602

LEARN A PERFORMANCE OF A MACHINE LEARNING MODEL ~604

RECEIVE FEEDBACK FOR THE MACHINE LEARNING MODEL BASED ON LEARNING THE PERFORMANCE THE MACHINE LEARNING MODEL WHERE THE FEEDBACK INCLUDES DOMAIN KNOWLEDGE PROVIDED BY A DOMAIN EXPERT ~606

TRAIN OF THE MACHINE LEARNING MODEL BASED THE FEEDBACK OF THE PERFORMANCE OF THE MACHINE LEARNING MODEL ~608

END ~610

PROVIDING ONLINE EXPERT-IN-THE-LOOP TRAINING OF MACHINE LEARNING MODELS

BACKGROUND OF THE INVENTION

Field of the Invention

The present invention relates in general to computing systems, and more particularly, to various embodiments for providing online expert-in-the-loop training of machine learning models by a processor.

Description of the Related Art

In today's society, consumers, businesspersons, educators, and others communicate over a wide variety of mediums in real time, across great distances, and many times without boundaries or borders. With the increased usage of computing networks, such as the Internet, humans are currently inundated and overwhelmed with the amount of information available to them from various structured and unstructured sources. Due to the recent advancement of information technology and the growing popularity of the Internet, a wide variety of computer systems have been used in machine learning. Machine learning is a form of artificial intelligence ("AI") that is employed to allow computers to evolve behaviors based on empirical data.

SUMMARY OF THE INVENTION

According to an embodiment of the present invention, a method for providing online expert-in-the-loop training of machine learning models in a computing environment, by one or more processors, is depicted. A performance of a machine learning model may be learned. Feedback for the machine learning model may be received based on learning the performance the machine learning model, where the feedback includes domain knowledge provided by a domain expert. The machine learning model may be trained or updated based the feedback of the performance of the machine learning model.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments are provided.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
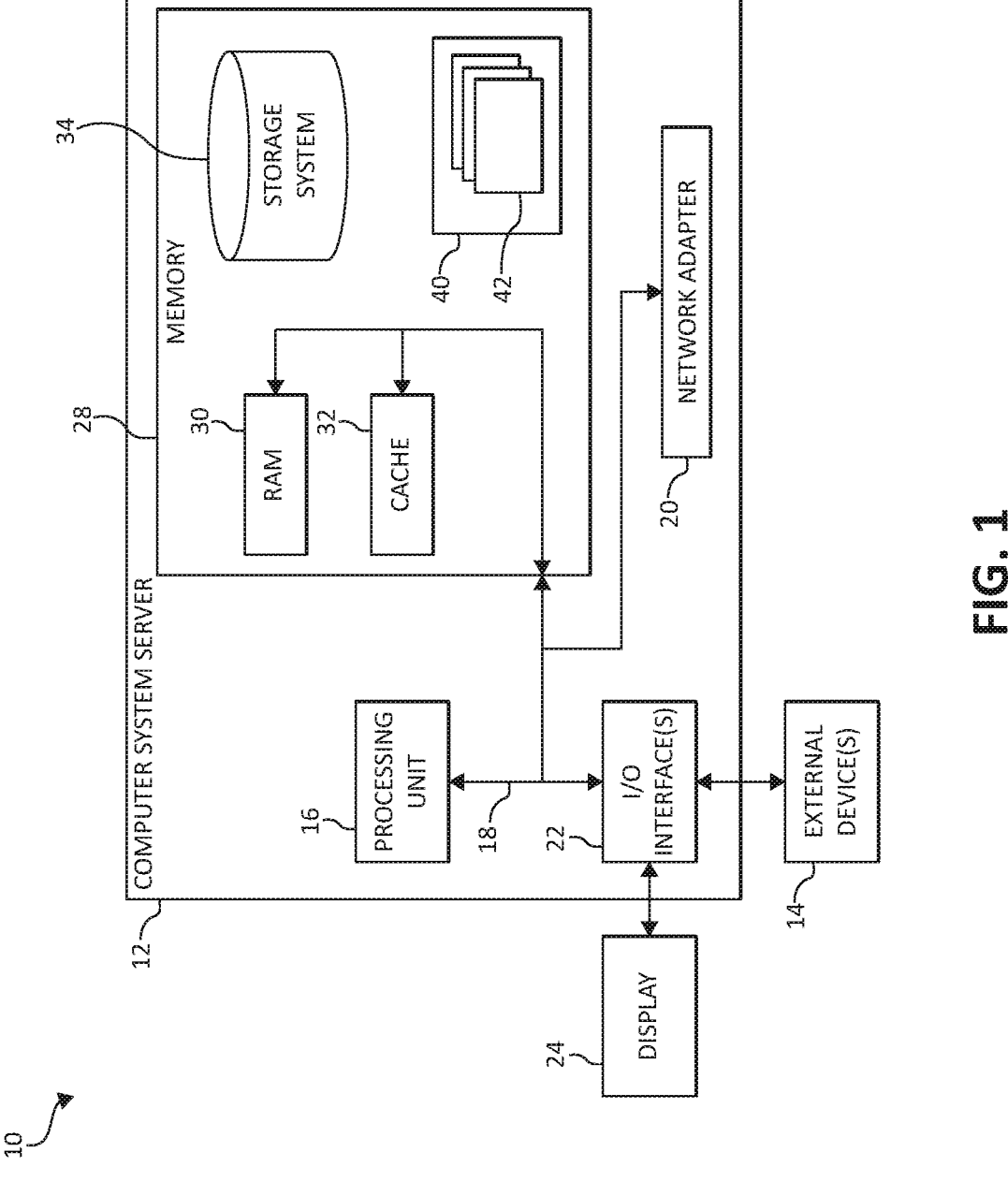
FIG. 1 is a block diagram depicting an exemplary cloud computing node according to an embodiment of the present invention.

Over the last decade, data analytics has become an important trend in many industries including e-commerce, healthcare, manufacturing and more. The reasons behind the increasing interest are the availability of data, variety of open-source machine learning tools and powerful computing resources. Nevertheless, machine learning tools for analyzing data are still difficult to use and automate, since a typical data analytics project contains many tasks that have not been fully automated yet. For example, predictive data analytics projects have attempted to provide automation tools yet there still remains a need to fully automate the various steps. Feature engineering, the cornerstone of successful predictive modeling, is one of the most important and time consuming tasks in predictive analytic operations because it prepares inputs to machine learning models, thus deciding how machine learning models will perform. It is difficult to know a priori which features are most optimal and what transformations or combination of those features most closely represents system dynamics and response. In practice, feature engineering is guided by domain expertise, user knowledge and intuition, together with an iterative, trial-and-error approach. Feature engineering is a critical step in data science, which impacts the final prediction results. Feature engineering involves understanding domain knowledge and data exploration to discover relevant handcrafted features from raw data.

"Features," for example, are the observations or characteristics on which a model is built. The process of deriving a new abstract feature based on the given data is broadly referred to as "feature engineering." Feature engineering is typically done using one of the many mathematical or statistical functions called "transformations." A key step in data science projects is the transformation of raw data into "features" that can be used as inputs for machine learning models. Often, the raw data is stored across various tables in a relational database and need to be combined in various ways. That is, "feature engineering" builds "features" out of existing data, which is often times spread out across multiple related tables. The relevant information needs to be extracted from the data and placed into a single table, which can then be used to train a machine learning model. What makes the task of effective feature engineering hard is that there are a vast number of options of transformations a data scientist could perform. Moreover, working through those options with the trial and error of applying transformations and assessing their impact is very time consuming, often infeasible to perform thoroughly. On the other hand, feature engineering is central to producing accurate models, which presents a dilemma to a data scientist on how much time to devote to it.

Moreover, the process of supervised machine learning operates on the principle of showing a machine learning model many pairs of datasets to enable the model to learn the relationship. In practice, an expert user or domain scientist typically provides such pertinent information that can be used to guide training such as, for example, physics equations, operational rules (e.g., regulations), and external events or disruptions (e.g., a global pandemic or current event hazardous to the public). Imparting such "human knowledge" to the model is extremely difficult and challenging and relies on specialized approaches, which are typically done while the machine learning model is offline (e.g., not connected to a computer or internet).

Thus, a need exists for providing online expert-in-the-loop training of machine learning models. Accordingly, the present invention provides for providing online expert-in-the-loop training of machine learning models in a computing environment, by one or more processors, is depicted. A performance of a machine learning model may be learned. Feedback for the machine learning model may be received based on learning the performance the machine learning model, where the feedback includes domain knowledge provided by a domain expert. The machine learning model may be trained or updated based the feedback of the performance of the machine learning model.

As used herein, "offline mode" or "offline" may refer to a traditional machine learning training step that kickstarts an overall prediction model training.

The "prediction mode" may be an operational mode that performs a primary purpose of computing predictions for the real-time data that it receives.

The "online mode" or "online" may be an operational mode that allows for reconfiguration of a prediction model to reflect high-level concepts that are to be introduced to the machine learning model, which is achieved via the following iterative steps. High level concepts provide a representation of the inputs to the model at a more granular level that allows the user to interact with these inputs. The higher-level concepts can include groupings based on similarities between different features, groupings based on spatial proximity, or temporal groupings such as "rush-hour traffic" categorization. Methods to generate these representations include a clustering methods such as K-Means, Principal Component Analysis (PCA), or Gaussian Process Regression. First, an explanation component analyzes the prediction model and produces explanations in the form of feature importance or observed/anticipated data drifts. Second, the computed information is conveyed to the user via a user board component. Third, a domain expert/user provides the high-level concepts that require an update and feeds it to an update component. Last, the update component carries each of the necessary updates such as, for example in the form of online data augmentation or few-optimization steps for updated concept layers. These steps can be carried out one or more times until the user is satisfied.

In some implementations, a base machine learning model (or a model after a limited number of training iterations) may be generated and uses an explainability operation to generate explanations for instances in the training set. A clustering routine is employed to group similar explanations together (i.e., high-level concepts). One or more domain experts may be enabled to provide feedback and adjust, correct, modify, updated, and/or add to the clustered explanations. The next retraining iteration of the base machine learning model uses explanation clusters or the adjusted explanations as "concepts" (i.e., concept bottlenecks—where concepts are generated from an explainer).

In other implementations, the present invention provides for online guidance of model training based on combining the learned, current model performance and expert user feedback. The present invention may combine both explainability and expert feedback, biases, or deviations in model performance that from a true state can be detected and corrected. An explainability operation is used to generate one or more explanation to inform a user on current performance and relevant concepts that explain model behavior. Using the provided explanations, the user is enabled to provide feedback back to the machine learning model (e.g., a system executing the machine learning model) to impart information, domain knowledge, and guidance to the machine learning model based on expertise and observations during model training.

For example, consider the example of predicting consumer demand. Typically, the consumer demand for an item is forecasted based on historical patterns of consumption, seasonality, promotions, etc. However, special conditions or events such as, for example, a global pandemic or an event that disrupts a society can lead to a breakdown or inaccuracies in providing the forecasts. Thus, inventory managers such as, for example, those that use these forecasts to purchase inventory, may look to inform an opinion by looking at past the special conditions or events to study how long demand may take to recover such as, for example, in considering demand patterns in other markets with similar special conditions or events. Accordingly, the present invention enables online expert-in-the-loop (e.g., a domain expert/user) training of machine learning models that retrain existing models based on such expert inputs, such that revised forecasts reflect both available data and expert opinion.

By way of example only, consider the following additional example. For example, in modelling of three-dimensional ("3D") geoscience processes such as, for example, ocean circulation, or weather patterns, challenges are present where heavy reliance is placed on an expert user to select appropriate operations, model architecture, features and training sets.

Explainability and visual approaches (e.g., heatmaps) show relevant patterns in the input based on feature importance, sensitivity analysis, or relevance scores to explain model decisions. Currently, the set of features is selected as part of the model selection and training phase. For ocean circulation, these could be lateral boundary information on flow speed, temperature, and salinity being introduced to the model domain from external, atmospheric inputs-to-surface such as, for example, air temperature, solar radiation, precipitation, etc., and bottom inputs such as, for example, ocean bed heating exchange and groundwater inflows; land runoffs such as rivers and streams; and properties of the flow such as turbulent parameters or viscosity coefficient that drive small-scale fluctuations and dynamics.

A domain expert user often has heuristic knowledge or domain expertise of the relative importance of these at different times of year. For example, river and land runoff may have greater influence during spring driven by snowmelt and high river flows. During summer on the other hand, it may be expected that the water column is thermally stratified driven by surface heating and a highly stable water column (low temperature and viscosity parameters).

While the features driving these dynamics are relatively well-known by an expert user, it is often difficult for a machine learning model to learn due to the high dimensionality of the dataset, pronounced temporal variations, and relatively small datasets. Thus, the present invention enables the online expert-in-the-loop training of machine learning models process and may monitor the relative importance given to different features during model scoring (e.g., local interpretable model-agnostic explanations ("LIME")-based feature importance) and adjust these by modifying concepts guiding model (online) training. In some implementations, the present invention provides for clustering concepts based on seasonal and other dynamics (e.g., clusters that represent stratified summer conditions, or clusters that represent complex salinity/freshwater flow patterns that develop during high-volume freshwater introduction).

In an alternative example, the present invention may be used for data augmentation by addressing bias. For example, consider a machine learning mode, which is trained on historical records in order to decide on admission to graduate schools. Thus, the present invention enables the online expert-in-the-loop training of machine learning models process and may generate one or more reason(s) behind the model's decision regarding why an admission is accepted or rejected, then provides the explanation to the users through employing an explainer operation. To resolve any potential bias (e.g., the machine learning model may fail to include certain types of data such as, for example, age, culture, etc.), a dataset can be augmented through generating synthetic instances in order to increase the size of the under-represented entity, concept, group, class, organization, or association (e.g., age group, population, and/or topic, etc.) by enabling a base or underlying machine learning model to be updated online to adapt to the newly generated synthetic data instances.

Thus, the present invention adopts explainable machine learning and expert-in-the-loop training to provide more targeted machine learning model training. In some aspect, the present invention provides for: 1) the ability for a user to monitor performance of the model (e.g., explainability model), 2) the ability to guide the training of a model in an online operation using domain expert inputs (e.g., an "expert-in-the-loop), 3) the ability for the model to incorporate high-level feedback or information to model training (e.g., online update of expert knowledge), 4) the ability for the domain expert to observe the impact of their feedback to model (e.g., explainability).

In some implementation, the present invention may use a machine learning model training operation, may use online explainability operations, and provide user feedback to machine learning model.

In other implementations, a machine learning model may include a knowledge domain that may be used and may include an ontology of concepts representing a domain of knowledge. A thesaurus or ontology may be used as the domain knowledge and may also be used to associate various characteristics, attributes, symptoms, behaviors, sensitivities, parameters, user profiles, computing device profiles, group profiles, and/or relationships and/or responsibilities between one or more users and/or computing devices. In one aspect, the term "domain" is a term intended to have its ordinary meaning. In addition, the term "domain" may include an area of expertise for a system or a collection of materials, information, content and/or other resources related to a particular subject or subjects.

The term ontology is also a term intended to have its ordinary meaning. In one aspect, the term ontology in its broadest sense may include anything that can be modeled as ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

It should be noted as described herein, the term "intelligent" (or "cognition") may be relating to, being, or involving conscious intellectual activity such as, for example, thinking, reasoning, or remembering, that may be performed using a machine learning. In an additional aspect, intelligent or "intelligence" may be the mental process of knowing, including aspects such as awareness, perception, reasoning and judgment. A machine learning system may use artificial reasoning to interpret data from one or more data sources (e.g., sensor-based devices or other computing systems) and learn topics, concepts, judgment reasoning knowledge, and/or processes that may be determined and/or derived by machine learning.

In general, as used herein, "optimize" may refer to and/or defined as "maximize," "minimize," "most likely," "best," or attain one or more specific targets, objectives, goals, or intentions. Optimize may also refer to maximizing a benefit to a user (e.g., maximize a trained machine learning pipeline/model benefit). Optimize may also refer to making the most effective or functional use of a situation, opportunity, or resource.

Additionally, optimizing need not refer to a best solution or result but may refer to a solution or result that "is good enough" or "most likely" for a particular application, for example. In some implementations, an objective is to suggest a "best" combination of preprocessing operations ("preprocessors") and/or machine learning models/machine learning pipelines, but there may be a variety of factors that may result in alternate suggestion of a combination of preprocessing operations ("preprocessors") and/or machine learning models yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/ non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
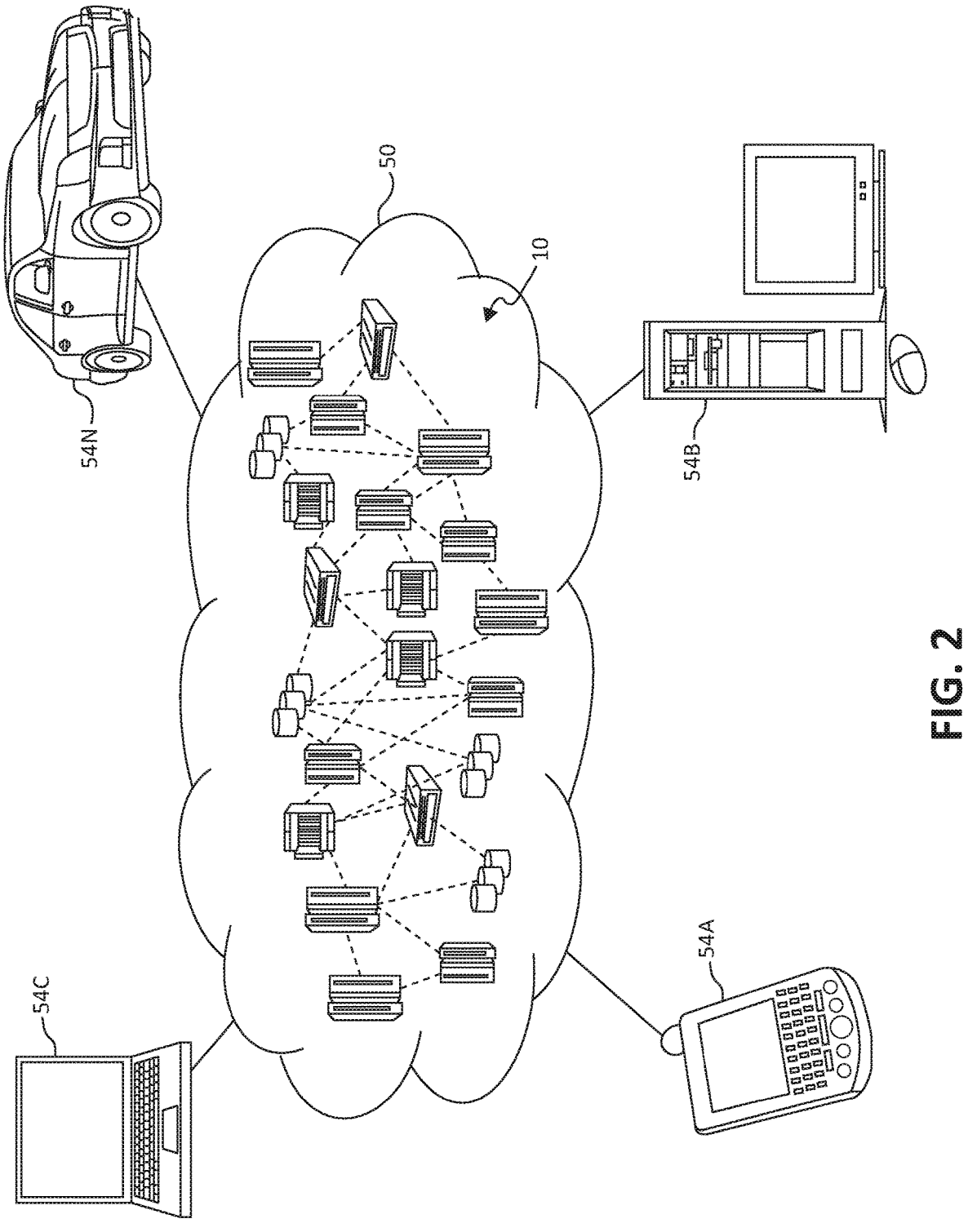
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
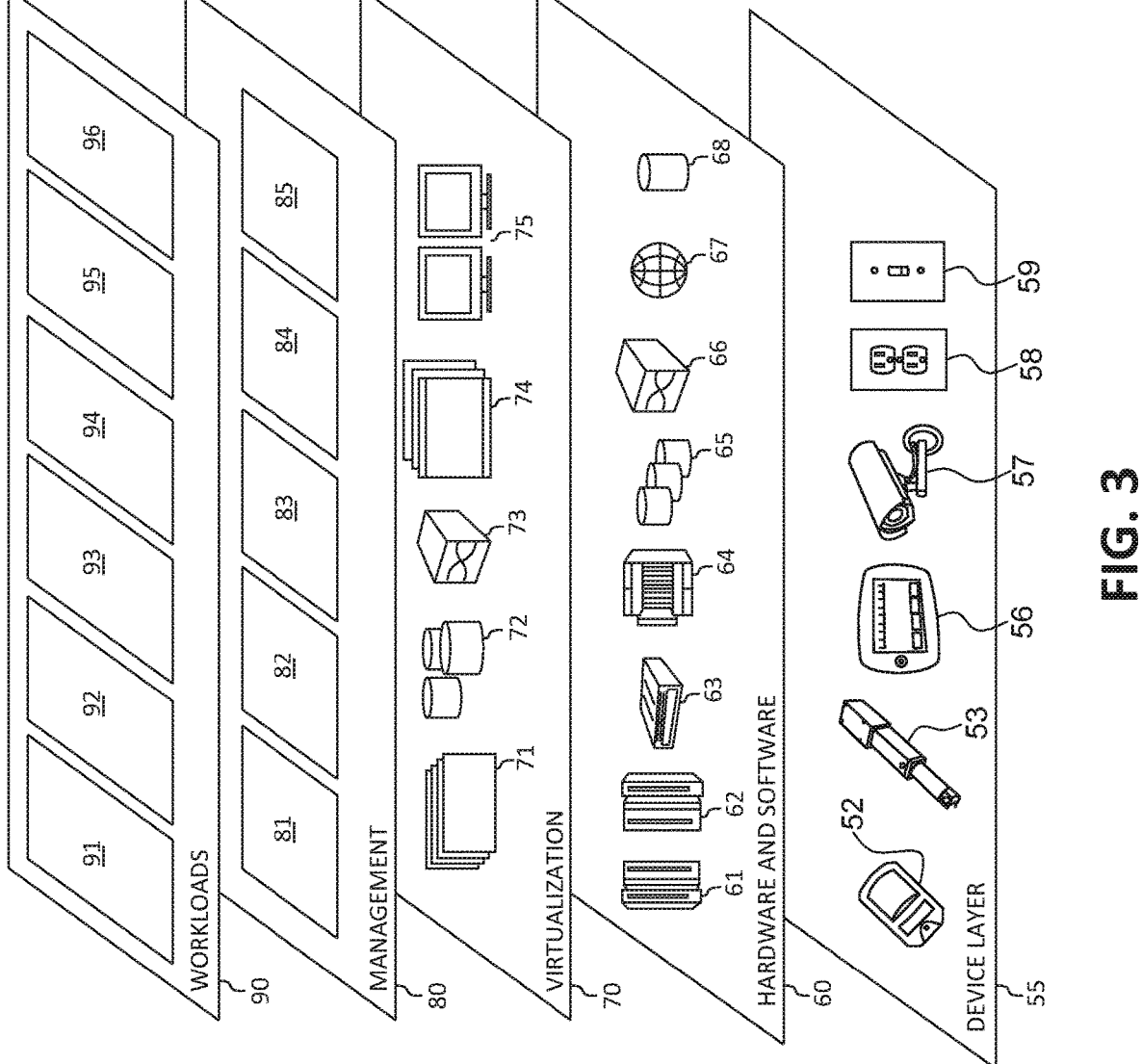
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IOT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing online expert-in-the-loop training of machine learning models. In addition, workloads and functions 96 for providing online expert-in-the-loop training of machine learning models may include such operations as data analytics, data analysis, and as will be further described, notification functionality. One of ordinary skill in the art will appreciate that the workloads and functions 96 for providing online expert-in-the-loop training of machine learning models may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the present invention provide novelty for providing online expert-in-the-loop training of machine learning models. In some implementations, the present invention uses explainable machine learning and expert-in-the-loop training to update machine learning model, based on prediction and feature contributions or importance. The present invention enables a user to interrogate and analyze machine learning model performance and diagnose the primary drivers influencing prediction. The present invention allows a user to guide and provide feedback to model based on expert knowledge. The present invention allows online training or update of the model based on expert feedback. The present invention allows a user to select clusters of input data and designate as high importance. The present invention allows a user to generate synthetic data that represent expert knowledge on system dynamics. The present invention allows a user to modify specific meta-parameters or hyper-parameters to a machine learning model based on expert knowledge. A hyperparameter is a parameter that is prescribed outside the training routine of the machine learning model and are prescribed by the user or tuned by some hyperparameter optimization techniques such as grid search or random search. Further, the "best choice" of algorithm for the problem or dataset at hand are not always evident. Meta-learning models assist the user automatically or semi-automatically select the most optimal algorithm and set of parameters for the given problem. These generally require the specification of meta-parameters to guide the learning.

Figure 4:
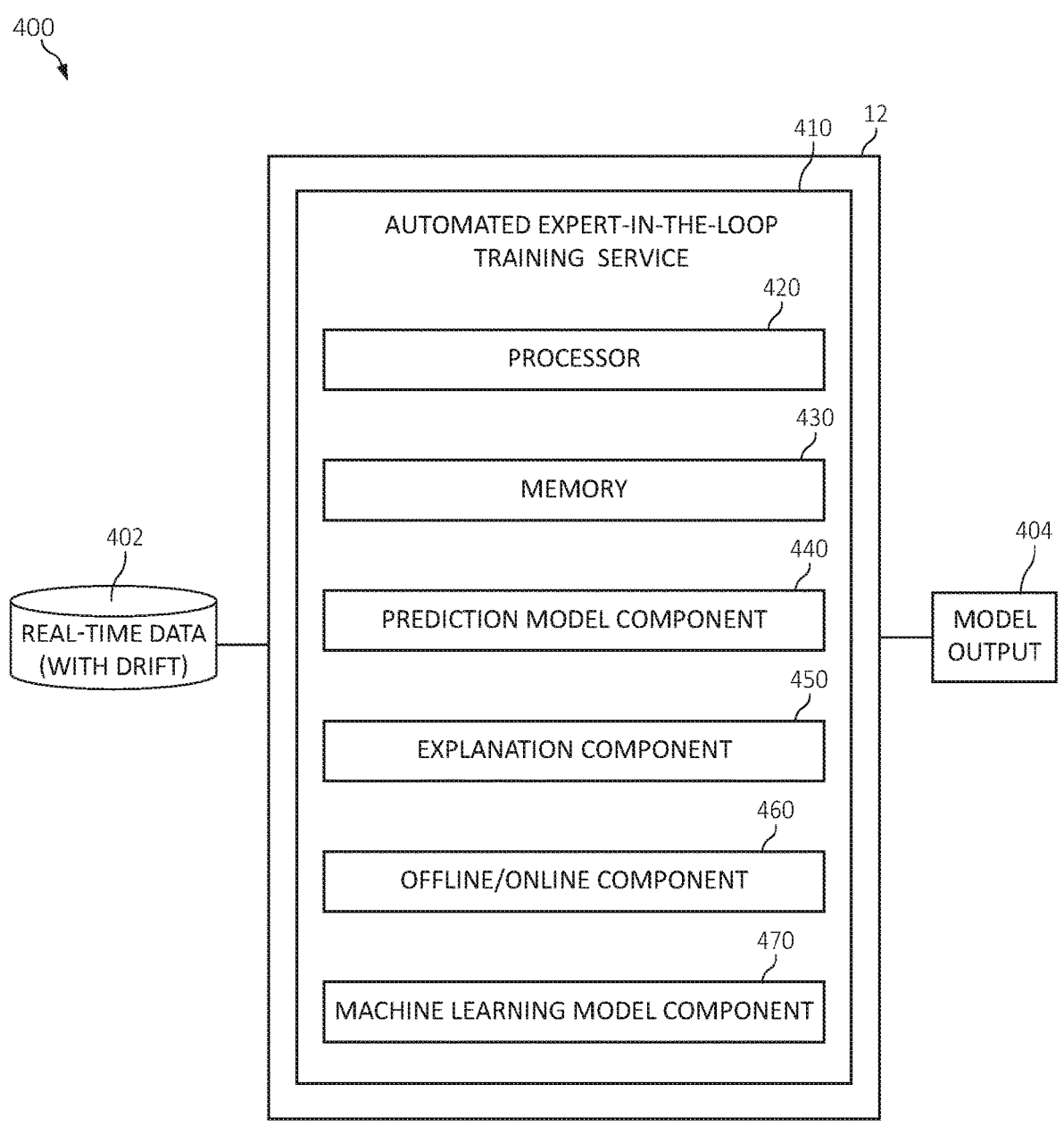
FIG. 4 is an additional block diagram depicting an exemplary functional relationships between various aspects of the present invention.

Turning now to FIG. 4, is a block diagrams depicting exemplary functional component 400 according to various mechanisms of the illustrated embodiments is shown. In one aspect, one or more of the components, modules, services, applications, and/or functions described in FIGS. 1-3 may be used in FIG. 4. Repetitive description of like elements employed in other embodiments described herein is omitted for sake of brevity.

Turning now to FIG. 4, an automated expert-in-the loop training service 410 is shown, incorporating processing unit ("processor") 420 to perform various computational, data processing and other functionality in accordance with various aspects of the present invention. The automated expert-in-the loop training service 410 may be provided by the computer system/server 12 of FIG. 1. The processing unit 420 may be in communication with memory 430. The automated expert-in-the loop training service 410 may include a prediction model component 440, an explanation component 450, an offline/online component 460, and a machine learning model component 470.

As one of ordinary skill in the art will appreciate, the depiction of the various functional units in automated expert-in-the loop training service 410 is for purposes of illustration, as the functional units may be located within the automated expert-in-the loop training service 410 or elsewhere within and/or between distributed computing components.

In general, by way of example only, the automated expert-in-the loop training service 410 may receive data from one or more data sources 402. In one aspect, the data sources 402 (e.g., real-time data with drift) may include a variety of types of data such as, for example, sensor data, internet of things ("IoT") data, tabular data, data from a knowledge domain, literature data (e.g., a corpus of literature such as, for example, arxiv), and/or data that describes semantic descriptors such as, for example, problem data, column data, etc.

For example, the input data from the data sources 402 may include columns of numerical data. The input data from the data sources 402 may also include equation/formula knowledge base that represent physical characteristics (e.g., heat transfer, advection diffusion process, conservation of momentum, fluid mechanics, etc.), and/or a combination of data used to guide semantic descriptors such as, for example, a problem topic, column label, column values, etc.

In some implementations, the automated expert-in-the loop training service 410, using the prediction model component 440, the explanation component 450, the offline/online component 460, and the machine learning model component 470 may learn a performance of a machine learning model; receive feedback for the machine learning model based on learning the performance the machine learning model, where the feedback includes domain knowledge provided by a domain expert; and train, retrain, or update the machine learning model based the feedback of the performance of the machine learning model. The trained, re-trained, or updated machine learning model may generate an output (e.g., a model output) such as, for example, model output 404.

The offline/online component 460 may be used to detect whether a computing system associated with user (e.g., a domain expert) is offline (e.g., not associated with, not in communication with the automated expert-in-the loop training service 410, or not connected to the internet) or is online (e.g., associated with, in communication with the automated expert-in-the loop training service 410, or connected to the internet). For example, the offline/online component 460 may detect a computer system associated with a domain expert may be online to receive and collect feedback from the domain expert via a user interface ("UI") associated with the computer system/server 12 and used by the prediction model component 440, the explanation component 450, the offline/online component 460, and the machine learning model component 470.

In some implementations, the explanation component 450 may generate one or more explanations for each one of a plurality of instances of the machine learning model. In some implementations, the explanation component 450 may adjust one or more explanations generated for each one of a plurality of instances of the machine learning model using the feedback. The explanation component 450 may group one or more explanations generated for each one of a plurality of instances of the machine learning model into one or more clusters of explanations based on similarity.

In some implementations, the automated expert-in-the loop training service 410, using the prediction model component 440, the explanation component 450, the offline/online component 460, and the machine learning model component 470 may use the one or more clusters of explanations as concepts for training of the machine learning model based the feedback.

The prediction model component 440 may map the feedback to one or more training model update operation rules. In some implementations, the automated expert-in-the loop training service 410, using the prediction model component 440 and the machine learning model component 470 may initialize a machine learning model to predict an output of the machine learning model based on the feedback, one or more explanations generated for each one of a plurality of instances of the machine learning model, and a prediction model, where the prediction model includes a model loss function, one or more machine learning model parameters, a dataset, or a combination thereof.

In some implementations, the automated expert-in-the loop training service 410, using the prediction model component 440, the explanation component 450, the offline/online component 460, and the machine learning model component 470 may learn physical knowledge data associated with a dataset from the one or more data sources 402; and transform the physical knowledge data into a semantic labels, which may be output 404 (e.g., semantic descriptors for the data such as, the data from data sources 402).

In some implementations, the automated expert-in-the loop training service 410, using the prediction model component 440, the explanation component 450, the offline/online component 460, and the machine learning model component 470 may learn behavior of a base machine learning model and identify one or more physical equation models having a degree of relevancy related to the data, and identify the semantic labels from one or more physical equation models having a degree of relevancy to the data for training the base machine learning model.

In some implementations, the automated expert-in-the loop training service 410, using the prediction model component 440, the explanation component 450, the offline/online component 460, and the machine learning model component 470 may receive multidimensional data, which is time dependent, from the data sources 402.

Also, it should be noted, by way of example only, the machine learning component 470 may determine one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
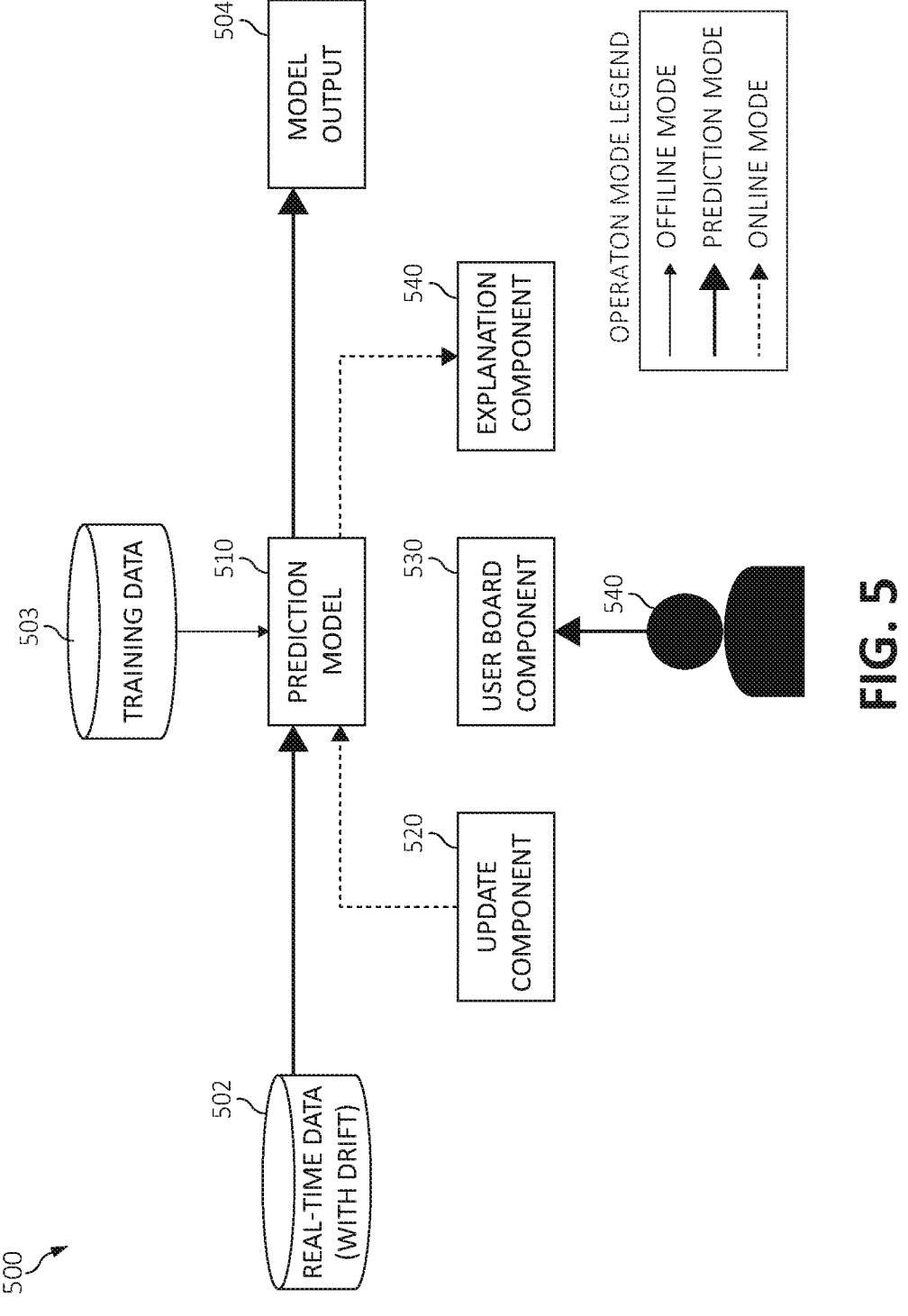
FIG. 5 is an additional block diagram exemplary operations for online expert-in-the-loop training of machine learning models in a computing environment according to an embodiment of the present invention.

For further explanation, FIG. 5 is a block diagram 500 depicting operations for providing online expert-in-the-loop training of machine learning models in a computing environment. In one aspect, one or more of the components, modules, services, applications, and/or functions described in FIGS. 1-4 may be used in FIG. 5. Repetitive description of like elements employed in other embodiments described herein is omitted for sake of brevity.

As depicted, a prediction model 510, an update component 520, a user board component 530, and an explanation component 540 may be in communication with each other and provided for online expert-in-the-loop training of machine learning models in a computing environment. In one aspect, the prediction model 510, the update component 520, the user board component 530, and the explanation component 540 may in include within and/or in association with automated expert-in-the loop training service 410 of FIG. 4. It should be noted that the operations, as depicted by "operation arrows" indicate operations based on an offline mode, a prediction mode, and/or an online mode.

It should be noted that the prediction model 510 may provide a base prediction model using real-time data 502, training data 503, and/or both the real-time data 502 and training data 503 for generating, training, retraining, and/or updated the base prediction model.

In some implementations, the explanation component 540 may receive, as input, details of one or more prediction models from the prediction model 510, which include model loss function, model parameters, and sample input-output. The explanation component 540 is also enabled/capable of determining feature-wise importance for a particular prediction. This allows the user to quantify how much individual features contributed to model prediction and guide selection or augmentation of those features.

The user board component 530 may serves as a primary interface (e.g., a UI of a computing system such as, for example, the automated expert-in-the loop training service 410 of FIG. 4), through which a user 540 (e.g., a domain expert) interacts with a system such as, for example, the automated expert-in-the loop training service 410 may be provided by the computer system/server 12 of FIG. 1. The user board component 530 may provide the output of explanation component 540 to the user 540. Additional information about the real-time data 502 can also be displayed via the user board component 530.

In some implementations, the user 540 considers, analyzes, and takes into account one or more similar and/or different explanations from the explanation component 540, along with domain specific information to guide the update component 520.

In some implementations, the update component 520 may perform the actual reconfiguration of the prediction model 510 being considered, tested, analyzed, and/or used to reflect one or more high-level concepts formulated by the user 540. These high level concepts may include a more granular representation of the data input to the model. This representation allows the user to extract information on how data groups or concepts provided to the model influence prediction. Through the user board component 530, the user 540 can provide high level concepts along with choice of update. Weighting or importance can be assigned to the selected update choice by the corresponding hyperparameter values prescribed by the user.

Thus, the components may be used as depicted in operation of the following examples. For example, in the inventory-demand use case, as described above, the following operations may be performed using the various components described in FIG. 5.

In some implementations, the prediction model 510 may be a model that forecasts customer demand for specific items (e.g., a machine learning/time-series model). The explanation component 540 may determine one or more features to the model that influence prediction (such as, for example, a local LIME or global rule sets that returns rule sets to influence forecast outcome) (e.g., increase in discretionary spending leads to higher forecast).

The user board component 530 may be a graphical user interface ("GUI") or computer interface that allows experts/users 540 to interact with a forecasting system (e.g., the user 540 may input rules or constraints on outcome variables). The user board component 530 may include additional detail of a value for the user 540 (e.g., a domain expert or expert-in-the-loop).

The update component 520 may include an operation or a set of operations to update training procedure employed by the prediction model 510 such as, for example, by updating a loss function, introducing penalties for violation of user-specified constraints, and/or changing model input parameters. The high-level feedback from experts/users 504 may be mapped to appropriate update operations, which may be a rule-based mapping between a set of known operations such as, for example, loss-function change or data augmentation and the high-level concepts (e.g., prioritize the effect of feature A or emphasize the performance in region X.)

More sophisticated operations, which map high level concepts to the indexed update operations that are learned based on machine learning models, may be provide by the update component 520. In some aspect, the most appropriate update mechanism for a given concept can be learned from historical updates. Using methods such as reinforcement learning, a model can be trained to identify the appropriate updated based on the concept selected by the user. The user 540 may be a domain expert for the provisioned service and provides feedback to the user board component 530.

Figure 6:
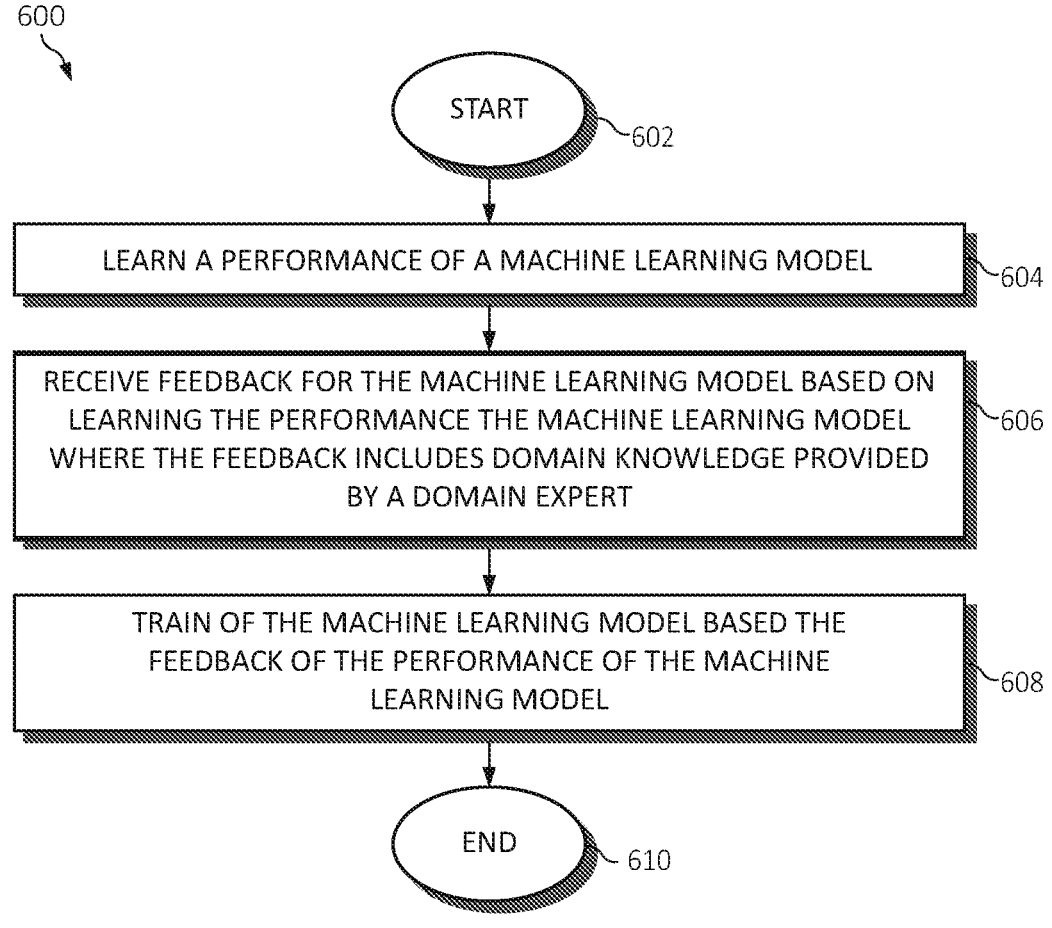
FIG. 6 is a flowchart diagram depicting an additional exemplary method for providing online expert-in-the-loop training of machine learning models in a computing environment according to an embodiment of the present invention.

FIG. 6 is a flowchart diagram depicting an exemplary method for providing online expert-in-the-loop training of machine learning models in a computing environment. In one aspect, each of the devices, components, modules, operations, and/or functions described in FIGS. 1-6 also may apply or perform one or more operations or actions of FIG. 6. The functionality 600 may be implemented as a method executed as instructions on a machine, where the instructions are included on at least one computer readable medium or one non-transitory machine-readable storage medium. The functionality 600 may start in block 602.

A performance of a machine learning model may be learned, as in block 604. Feedback for the machine learning model may be received based on learning the performance the machine learning model, where the feedback includes domain knowledge provided by a domain expert, as in block 606. The machine learning model may be trained or updated based the feedback of the performance of the machine learning model, as in block 608. In one aspect, the functionality 600 may end, as in block 610.

In one aspect, in conjunction with and/or as part of at least one block of FIG. 6, the operations of method 600 may include each of the following. The operations of method 600 may generate one or more explanations for each one of a plurality of instances of the machine learning model. The operations of method 600 may adjust one or more explanations generated for each one of a plurality of instances of the machine learning model using the feedback.

The operations of method 600 may group one or more explanations generated for each one of a plurality of instances of the machine learning model into one or more clusters of explanations based on similarity; and use the one or more clusters of explanations as concepts for training of the machine learning model based the feedback.

The operations of method 600 may map the feedback to one or more training model update operation rules. The operations of method 600 may initialize a machine learning model to predict an output of the machine learning model based on the feedback, one or more explanations generated for each one of a plurality of instances of the machine learning model, and a prediction model, wherein the prediction model includes a model loss function, one or more machine learning model parameters, a dataset, or a combination thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for providing expert-in-the-loop training of machine learning models in a computing environment, comprising:

evaluating performance of a machine learning model;

receiving feedback for the machine learning model based on the evaluating the performance of the machine learning model, wherein the feedback includes domain knowledge provided by a domain expert that updates a training procedure of the machine learning model by modifying constraints of the machine learning model;

generating synthetic data to increase a size of an under-represented entity within a dataset used to train the machine learning model; and online training of the machine learning model based on the feedback of the performance of the machine learning model and the synthetic data.

2. The method of claim 1, further including generating one or more explanations for each one of a plurality of instances of the machine learning model.

3. The method of claim 1, further including adjusting one or more explanations generated for each one of a plurality of instances of the machine learning model using the feedback.

4. The method of claim 1, further including grouping one or more explanations generated for each one of a plurality of instances of the machine learning model into one or more clusters of explanations based on similarity.

5. The method of claim 4, further including using the one or more clusters of explanations as concepts for training of the machine learning model based the feedback.

6. The method of claim 1, further including mapping the feedback to one or more training model update operation rules.

7. The method of claim 1, further including initializing a machine learning model to predict an output of the machine learning model based on the feedback, one or more explanations generated for each one of a plurality of instances of the machine learning model, and a prediction model, wherein the prediction model includes a model loss function, one or more machine learning model parameters, a dataset, or a combination thereof.

8. A system for providing expert-in-the-loop training of machine learning models in a computing environment, comprising:

one or more computers with executable instructions that when executed cause the system to:

evaluate a performance of a machine learning model;

receive feedback for the machine learning model based on the evaluating the performance of the machine learning model, wherein the feedback includes domain knowledge provided by a domain expert that updates a training procedure of the machine learning model by modifying constraints of the machine learning model;

generate synthetic data to increase a size of an under-represented entity within a dataset used to train the machine learning model; and train while online the machine learning model based on the feedback of the performance of the machine learning model and the synthetic data.

9. The system of claim 8, wherein the executable instructions that when executed cause the system to generate one or more explanations for each one of a plurality of instances of the machine learning model.

10. The system of claim 8, wherein the executable instructions that when executed cause the system to adjust one or more explanations generated for each one of a plurality of instances of the machine learning model using the feedback.

11. The system of claim 8, wherein the executable instructions that when executed cause the system to group one or more explanations generated for each one of a plurality of instances of the machine learning model into one or more clusters of explanations based on similarity.

12. The system of claim 11, wherein the executable instructions that when executed cause the system to use the one or more clusters of explanations as concepts for training of the machine learning model based the feedback.

13. The system of claim 8, wherein the executable instructions that when executed cause the system to map the feedback to one or more training model update operation rules.

14. The system of claim 8, wherein the executable instructions that when executed cause the system to initialize a machine learning model to predict an output of the machine learning model based on the feedback, one or more explanations generated for each one of a plurality of instances of the machine learning model, and a prediction model, wherein the prediction model includes a model loss function, one or more machine learning model parameters, a dataset, or a combination thereof.

15. A computer program product for providing expert-in-the-loop training of machine learning models in a computing environment, the computer program product comprising:

one or more computer readable storage media, and program instructions collectively stored on the one or more computer readable storage media, the program instruction comprising:

program instructions to evaluate a performance of a machine learning model;

program instructions to receive feedback for the machine learning model based on the evaluating the performance of the machine learning model, wherein the feedback includes domain knowledge provided by a domain expert that updates a training procedure of the machine learning model by modifying constraints of the machine learning model;

program instructions to generate synthetic data to increase a size of an underrepresented entity within a dataset used to train the machine learning model; and program instructions to train while online the machine learning model based on the feedback of the performance of the machine learning model and the synthetic data.

16. The computer program product of claim 15, further including program instructions to generate one or more explanations for each one of a plurality of instances of the machine learning model.

17. The computer program product of claim 15, further including program instructions to adjust one or more explanations generated for each one of a plurality of instances of the machine learning model using the feedback.

18. The computer program product of claim 15, further including program instructions to:

group one or more explanations generated for each one of a plurality of instances of the machine learning model into one or more clusters of explanations based on similarity; and use the one or more clusters of explanations as concepts for training of the machine learning model based the feedback.

19. The computer program product of claim 15, further including program instructions to map the feedback to one or more training model update operation rules.

20. The computer program product of claim 15, further including program instructions to initialize a machine learning model to predict an output of the machine learning model based on the feedback, one or more explanations generated for each one of a plurality of instances of the machine learning model, and a prediction model, wherein the prediction model includes a model loss function, one or more machine learning model parameters, a sample Input/Output (I/O) dataset, or a combination thereof.

* * * * *